(12) United States Patent
Eda

(10) Patent No.: US 10,533,593 B2
(45) Date of Patent: Jan. 14, 2020

(54) FASTENER

(71) Applicant: TOYOTA JIDOSHA KABUSHIKI KAISHA, Toyota-shi, Aichi-ken (JP)

(72) Inventor: Naoyuki Eda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 15/703,233

(22) Filed: Sep. 13, 2017

(65) Prior Publication Data

US 2018/0106285 A1 Apr. 19, 2018

(30) Foreign Application Priority Data

Oct. 14, 2016 (JP) ................................. 2016-202931

(51) Int. Cl.
*F16B 19/08* (2006.01)
*F16B 5/04* (2006.01)

(52) U.S. Cl.
CPC .............. *F16B 19/086* (2013.01); *F16B 5/04* (2013.01)

(58) Field of Classification Search
CPC ............................... F16B 39/086; F16B 39/10
USPC ....................................................... 411/501
See application file for complete search history.

(56) References Cited

U.S. PATENT DOCUMENTS

| | | | | |
|---|---|---|---|---|
| 2,594,840 A * | 4/1952 | Allison | ................... | F16B 19/06 403/408.1 |
| 3,555,673 A * | 1/1971 | Summerlin | ............ | B21J 15/043 29/844 |
| 4,828,138 A * | 5/1989 | Andersson | ............... | B65D 5/70 220/270 |
| 4,913,609 A * | 4/1990 | Mauer | ................ | F16B 19/1054 411/107 |
| 6,814,531 B2 * | 11/2004 | Stevenson | ............. | F16B 19/086 411/179 |
| 2005/0264754 A1* | 12/2005 | Cody | ........................ | G02C 5/02 351/92 |
| 2007/0169415 A1* | 7/2007 | Jain | ........................ | E05F 11/382 49/348 |

FOREIGN PATENT DOCUMENTS

JP    2001-304214 A    10/2001
JP    2002-364617 A    12/2002

* cited by examiner

*Primary Examiner* — Gary W Estremsky
(74) *Attorney, Agent, or Firm* — Oliff PLC

(57) ABSTRACT

A fastener includes a head portion, a leg portion, and an easily deformable portion. The head portion is formed in a cylindrical shape with an oval shape in an axial view. The leg portion has one end portion in an axial direction that is connected to a back surface of the head portion. The leg portion is formed in a hollow cylindrical shape with an oval shape in the axial view whose minor axis direction is the same as a minor axis direction of the oval shape of the head portion. The easily deformable portion is provided to a pair of major-axis leg portions which are portions crossing a major axis in the leg portion.

3 Claims, 5 Drawing Sheets

FASTENER

INCORPORATION BY REFERENCE

The disclosure of Japanese Patent Application No. 2016-202931 filed on Oct. 14, 2016 including the specification, drawings and abstract is incorporated herein by reference in its entirety.

BACKGROUND

1. Technical Field

The disclosure relates to a fastener.

2. Description of Related Art

Japanese Patent Application Publication No. 2001-304214 (JP 2001-304214 A) discloses a joining structure by a rivet. In this joining structure, a leading end portion of the rivet driven into two to-be-joined members is extended into a generally oval shape in an axial view of the rivet so as to be caulked. This makes it possible to increase the resistance force when an input is applied to rotate one of the to-be-joined members in a surface direction with respect to the other to-be-joined member.

SUMMARY

However, in the structure disclosed in JP 2001-304214 A, when portions, where the rivet is driven, of the to-be-joined members are narrow, it is necessary to use the rivet with a small diameter to match these narrow portions, but since the caulking area becomes small with such a small-diameter rivet, there is a possibility that the joining strength may be lowered. Therefore, the above-described prior art still has room for improvement in this aspect.

The disclosure provides a fastener that can join to-be-joined members to each other at narrow portions of the to-be-joined members without lowering the joining strength.

A fastener according to the disclosure includes a head portion, a leg portion, and an easily deformable portion. The head portion is formed in a cylindrical shape with an oval shape in an axial view. The leg portion has one end portion in an axial direction that is connected to a back surface of the head portion. The leg portion is formed in a hollow cylindrical shape with an oval shape in the axial view whose minor axis direction is the same as a minor axis direction of the oval shape of the head portion. The leg portion is configured such that when a fastening load is applied from the head portion, another end portion in the axial direction of the leg portion is deformed radially outward of the leg portion in a plurality of to-be-joined members so as to caulk the to-be-joined members to each other. The easily deformable portion is provided to a pair of major-axis leg portions which are portions crossing a major axis in the leg portion. The easily deformable portion is configured such that when the fastening load is applied, the major-axis leg portions are deformable radially outward of the leg portion similarly to a portion, other than the major-axis leg portions, of the leg portion.

According to an aspect of the disclosure, the head portion and the leg portion of the fastener are respectively formed in the oval shapes in the axial view such that the minor axis direction of the head portion and the minor axis direction of the leg portion are the same. Therefore, as one example, even when the width of portions, where the fastener is driven, of the to-be-joined members is small, it is possible to insert the fastener into the to-be-joined members to join them together by disposing the fastener such that the minor axes of the head portion and the leg portion coincide with the width direction of the to-be-joined members. Further, since the circumferential length of the leg portion in the aspect of the disclosure becomes greater than that of a fastener having a circular shape with a size that is within the width of the to-be-joined members, the range of caulking to the to-be-joined members becomes greater so that it is possible to suppress lowering of the joining strength.

Further, in the aspect of the disclosure, the easily deformable portion is provided to each of the major-axis leg portions which are portions crossing the major axis in the leg portion. In general, since each major-axis leg portion is a portion where the curvature is large in the circumferential direction of the leg portion, the flexural rigidity is high, and therefore, each major-axis leg portion is difficult to deform radially outward when the fastening load is applied. However, in the aspect of the disclosure, by means of the easily deformable portion, each major-axis leg portion is deformable radially outward similarly to the other portions of the leg portion, and therefore, it is possible to approximately uniformly open the entire leg portion radially outward.

The easily deformable portion may be configured such that the thickness of the major-axis leg portion is made smaller than that of the leg portion other than the major-axis leg portions.

According to the aspect of the disclosure, since the easily deformable portion is configured such that the thickness of the major-axis leg portion is made smaller than that of the leg portion other than the major-axis leg portions, the easily deformable portion reduces the flexural rigidity of the major-axis leg portion. Therefore, each major-axis leg portion provided with the easily deformable portion is deformable radially outward similarly to the other portions of the leg portion.

Along an inner periphery at the other end portion of the leg portion, an inclined surface that is inclined radially outward with respect to the axial direction of the leg portion may be provided on the leading end side of the other end portion, and the easily deformable portion may be configured such that an inclination angle of the inclined surface of the major-axis leg portion with respect to the axial direction of the leg portion is made smaller than an inclination angle of an inclined surface of the leg portion other than the major-axis leg portions with respect to the axial direction of the leg portion.

According to the aspect of the disclosure, the inclined surface is provided along the inner periphery at the other end portion of the leg portion. The inclined surface is inclined radially outward with respect to the axial direction of the leg portion on the leading end side of the other end portion. Herein, easily deformable portion is configured such that the inclination angle of the inclined surface of the major-axis leg portion with respect to the axial direction of the leg portion is made smaller than the inclination angle of the inclined surface of the leg portion other than the major-axis leg portions with respect to the axial direction of the leg portion. In other words, the other end portion of each major-axis leg portion has a sharp shape compared to the other end portion of the leg portion other than the major-axis leg portions. Therefore, since easily deformable portion reduces the flexural rigidity of the major-axis leg portion, each major-axis leg portion provided with the easily deformable portion is deformable radially outward similarly to the other portions of the leg portion.

The easily deformable portion may be configured such that the major-axis leg portion is inclined radially outward with respect to the axial direction of the leg portion on the other end portion side compared to the leg portion other than the major-axis leg portions.

According to the aspect of the disclosure, since the easily deformable portion is configured such that the major-axis leg portion is inclined radially outward with respect to the axial direction of the leg portion on the other end portion side compared to the leg portion other than the major-axis leg portions, when the fastening load is applied to the leg portion along the axial direction, each major-axis leg portion tends to be deformed radially outward. Therefore, each major-axis leg portion provided with the easily deformable portion is deformable radially outward similarly to the other portions of the leg portion.

The fastener according to the disclosure has an excellent effect in that it is possible to join the to-be-joined members to each other at narrow portions of the to-be-joined members without lowering the joining strength.

The fastener according to the aspect of the disclosure has an excellent effect in that it is possible to more reliably join the to-be-joined members to each other at narrow portions of the to-be-joined members without lowering the joining strength.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinbelow, a fastener according to a first embodiment of the disclosure will be described with reference to FIGS. 1A to 4D.

Figure 1A:
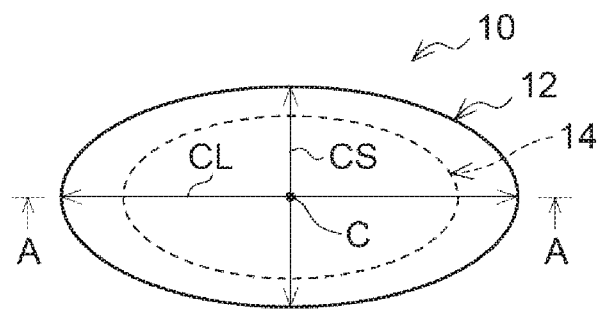
FIG. 1A is an enlarged plan view showing a state where a fastener according to a first embodiment is seen in an axial view.
Figure 1B:
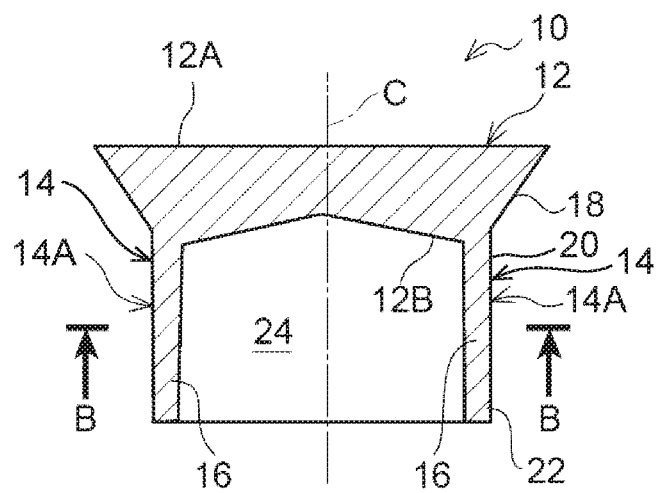
FIG. 1B is a longitudinal sectional view showing a state taken along line A-A of FIG. 1A.

As shown in FIG. 1B, a self-piercing rivet (also called an "SPR"; hereinafter referred to simply as a "rivet") 10 as a fastener according to this embodiment has a head portion 12 and a leg portion 14.

As shown in FIG. 1A, the head portion 12 is formed in a generally cylindrical shape with an oval shape in an axis C direction view. Specifically, the oval shape of the head portion 12 is set such that the ratio of the lengths of a major axis CL and a minor axis CS is 5 to 5.5:3 to 4 in the axis C direction view. An outer peripheral surface 18 of the head portion 12 is inclined so as to approach the axis C as it extends to the leg portion 14 side (see FIG. 1B).

The leg portion 14 is formed in a generally hollow cylindrical shape with an oval shape in the axis C direction view whose minor axis direction is the same as a minor axis direction of the oval shape of the head portion 12 and which is smaller than the oval shape of the head portion 12. In other words, the head portion 12 and the leg portion 14 are arranged such that their major axes CL and minor axes CS are overlapped with each other in the axis C direction view. One end portion 20 in the axial direction of the leg portion 14 is integrally connected to a back surface 12B of the head portion 12. The other end portion 22 in the axial direction of the leg portion 14 serves as a portion that is first inserted into a plurality of to-be-joined members stacked in the axis C direction. The inside 24 of the leg portion 14 is a cavity that is closed on its upper side by the head portion 12 and is opened to the outside on its lower side.

Figure 1C:
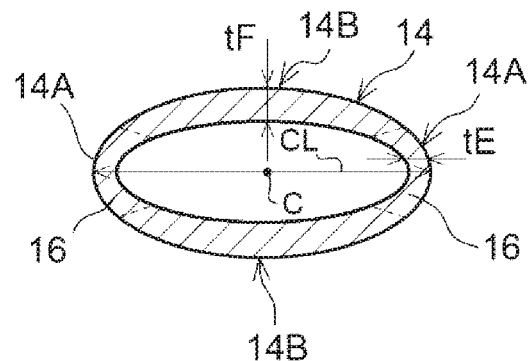
FIG. 1C is a cross-sectional view showing a state taken along line B-B of FIG. 1B.

As shown in FIG. 1C, a pair of easily deformable portions 16 are provided each at a corresponding one of major-axis leg portions 14A (portions surrounded by broken lines in FIG. 1C by way of example) which are portions crossing the major axis CL in the leg portion 14. Each easily deformable portion 16 forms a range from the one end portion 20 to the other end portion 22 of the major-axis leg portion 14A (see FIG. 1B), and a thickness tE of each major-axis leg portion 14A provided with the easily deformable portion 16 is made smaller than those of portions, other than the easily deformable portions 16, of the leg portion 14. As one example, the thickness tE of each major-axis leg portion 14A is set in a range of about 0.6 mm to 0.9 mm, while a thickness tF of each of minor-axis leg portions 14B which are portions crossing the minor axis CS in the leg portion 14 is set in a range of about 0.75 mm to 1.5 mm and set greater than the thickness tE.

Figure 4A:
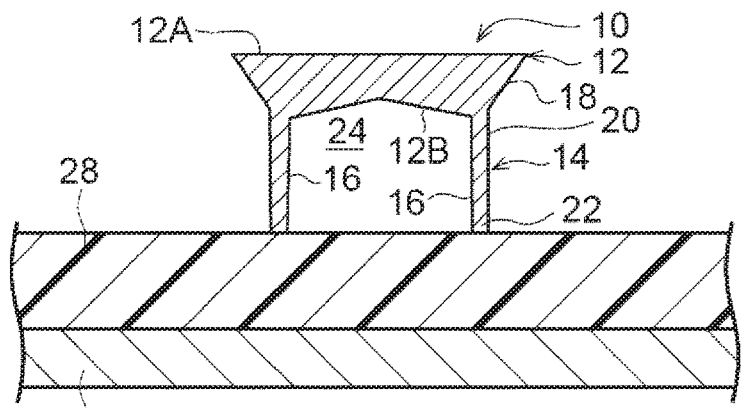
FIG. 4A is a process sectional view for sequentially explaining a fastening method of the fastener shown in FIGS. 1A to 1C.

(Fastening Method of Fastener) A method of fastening (caulking) a plurality of members using the rivet 10 is as follows. First, as shown in FIG. 4A, a plate-shaped metal plate 26 as a to-be-joined member made of an aluminum alloy is stacked on a plate-shaped metal plate 28 as a to-be-joined member made of an aluminum alloy, and the rivet 10 according to this embodiment is set on a front surface of the metal plate 28. The metal plate 26 is stacked on the metal plate 28 such that a front surface of the metal plate 26 faces a back surface, opposite to the side where the rivet 10 is set, of the metal plate 28. The metal plate 26 is plate-shaped, but may alternatively be a block-shaped member. The rivet 10 is set such that the other end portion 22 of the leg portion 14 is directed downward, while a front surface 12A of the head portion 12 is directed upward.

Figure 4B:
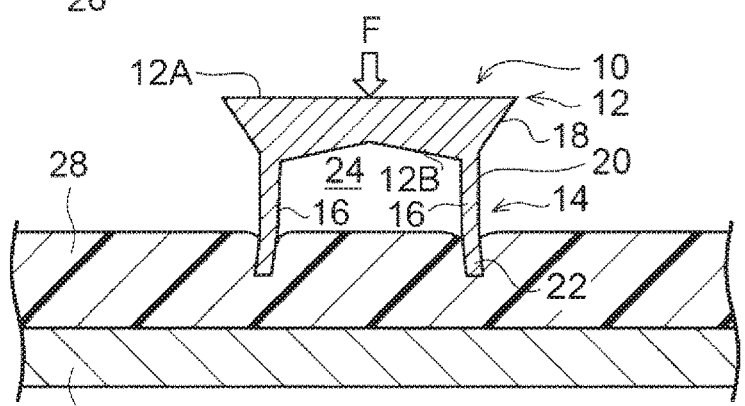
FIG. 4B is a process sectional view for sequentially explaining the fastening method of the fastener shown in FIGS. 1A to 1C.

As shown in FIG. 4B, a fastening pressure (fastening load) F that acts downward is externally applied to the front surface 12A of the head portion 12 of the rivet 10. The fastening pressure F is applied by a punch (not shown). When the fastening pressure F is applied, insertion of the leg portion 14 is started in a thickness direction from the front surface of the metal plate 28.

Figure 4C:
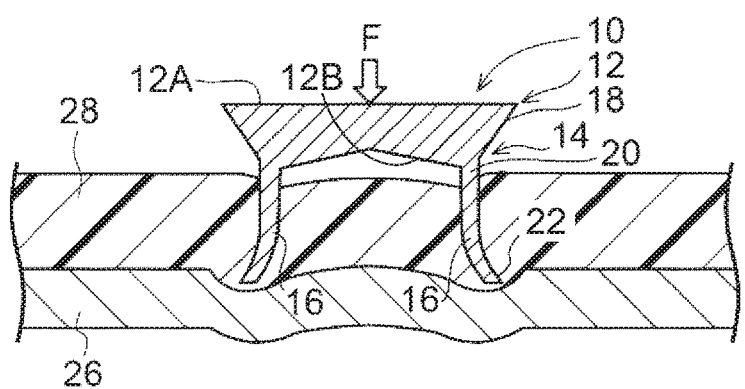
FIG. 4C is a process sectional view for sequentially explaining the fastening method of the fastener shown in FIGS. 1A to 1C.

Subsequently, when the fastening pressure F is further applied, as shown in FIG. 4C, the leg portion 14 of the rivet 10 is inserted into the metal plate 28 and reaches the back surface side of the metal plate 28. In this event, by the insertion of the rivet 10, the back surface of the metal plate 28 slightly protrudes (rises) downward, so that a back surface of the metal plate 26 is recessed downward. When inserted into the metal plate 28, the leg portion 14 starts to deform while extending radially outward of the leg portion 14. Note that, by the insertion of the rivet 10, the back surface of the metal plate 26 protrudes downward like the back surface of the metal plate 28.

Figure 4D:
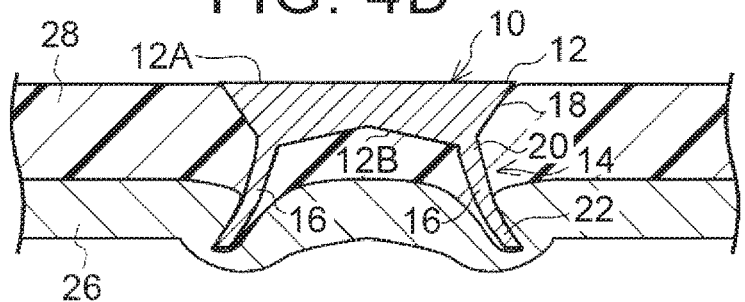
FIG. 4D is a process sectional view for sequentially explaining the fastening method of the fastener shown in FIGS. 1A to 1C.

Subsequently, when the fastening pressure F is further applied, as shown in FIG. 4D, the leg portion 14 of the rivet 10 is inserted into the metal plate 28 and the metal plate 26 until the front surface 12A of the head portion 12 is located substantially flush with the front surface of the metal plate 28. In this event, the leg portion 14 bites into a front surface portion of the metal plate 26 via a protruding portion of the metal plate 28 and is deformed and caulked by extending radially outward of the leg portion 14 in all directions. Note that the leg portion 14 may pass through the metal plate 28 and directly bite into the metal plate 26. When the caulking has completed, the metal plate 28 is fastened to the metal plate 26 using the rivet 10, so that the fastening structure in which the metal plate 28 is fastened to the metal plate 26 using the rivet 10 is completed.

(Operation and Effect of First Embodiment) Next, the operation and effect of this embodiment will be described.

Figure 3:
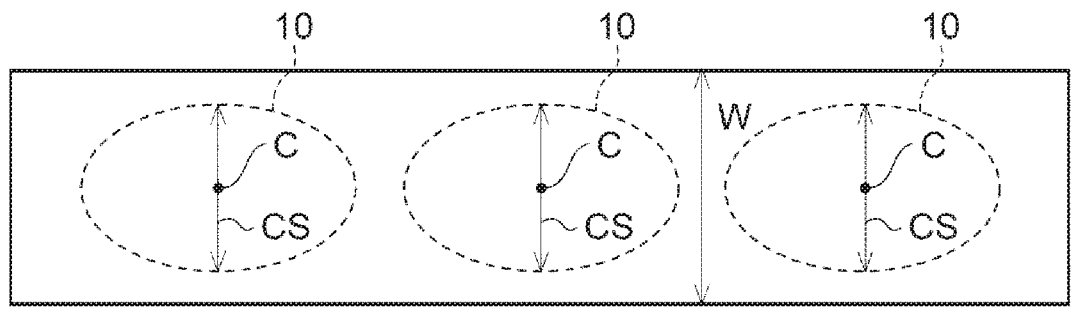
FIG. 3 is a plan view showing a state where a plurality of fasteners according to the first embodiment are provided in to-be-joined members.

In this embodiment, as shown in FIG. 1A, the head portion 12 and the leg portion 14 of the rivet 10 are respectively formed in oval shapes in the axis C direction view such that the minor axis direction of the head portion 12 and the minor axis direction of the leg portion 14 are the same. Therefore, as shown in FIG. 3, even when a width W of portions, where the rivet 10 is driven, of to-be-joined members is small, it is possible to insert the rivet 10 into the to-be-joined members to join them together by disposing the rivet 10 such that the minor axes CS of the head portion 12 and the leg portion 14 coincide with the width W direction of the to-be-joined members. Further, since the circumferential length of the leg portion 14 in this embodiment becomes greater than that of a rivet (not shown) having a circular shape with a size that is within the width W of the to-be-joined members, the range of caulking to the to-be-joined members becomes greater so that it is possible to suppress lowering of the joining strength.

Figure 2:
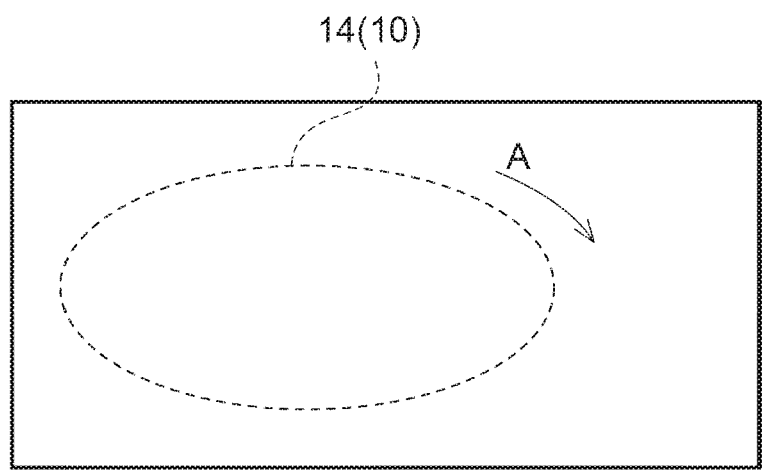
FIG. 2 is a plan view showing a state where the fastener according to the first embodiment is provided in to-be-joined members.

Further, since the leg portion 14 is formed in the oval shape in the axis C direction view, even when, as shown in FIG. 2, a force is applied to rotate a to-be-joined member in a surface direction (a direction of an arrow A), it is possible to suppress the rotation of the to-be-joined member.

Further, as shown in FIG. 1C, the easily deformable portion 16 is provided at part of each of the major-axis leg portions 14A which are portions crossing the major axis CL in the leg portion 14. In general, since each major-axis leg portion 14A is a portion where the curvature is large in the circumferential direction of the leg portion 14, the flexural rigidity is high, and therefore, each major-axis leg portion 14A is difficult to deform radially outward when the fastening load is applied. However, in this embodiment, by means of the easily deformable portion 16, each major-axis leg portion 14A is deformable radially outward similarly to the other portions of the leg portion 14, and therefore, it is possible to approximately uniformly open the entire leg portion 14 radially outward. Specifically, since the thickness tE of each easily deformable portion 16 is made smaller than the thickness of the leg portion 14 other than the easily deformable portions 16, each easily deformable portion 16 reduces the flexural rigidity of the major-axis leg portion 14A. Therefore, each major-axis leg portion 14A provided with the easily deformable portion 16 is deformable radially outward similarly to the other portions of the leg portion 14. Consequently, the rivet 10 can join the to-be-joined members to each other at narrow portions of the to-be-joined members without lowering the joining strength.

Further, since the thickness tE of each major-axis leg portion 14A provided with the easily deformable portion 16 is set smaller than those of the other portions, the volume of the entire leg portion 14 becomes small compared to a case where no easily deformable portion 16 is provided. Therefore, in the configuration of this embodiment, the deformation of the leg portion 14 at the time of caulking is carried out with a lower fastening load compared to a case where no easily deformable portion 16 is provided to the leg portion 14. That is, it is possible to reduce the fastening pressure F at the time of caulking.

Second Embodiment

Next, a fastener according to a second embodiment of the disclosure will be described with reference to FIGS. 5A and 5B. The same symbols are assigned to portions having basically the same configurations as the above-described first embodiment, thereby omitting description thereof.

A rivet 30 as a fastener according to the second embodiment has the same basic configuration as the first embodiment and differs in that an inclination angle of an inclined surface 34 of each of major-axis leg portions 38A of a leg portion 38 with respect to an axis C is made smaller than an inclination angle of each of inclined surfaces 35 of the leg portion 38 other than the major-axis leg portions 38A with respect to the axis C.

Figure 5A:
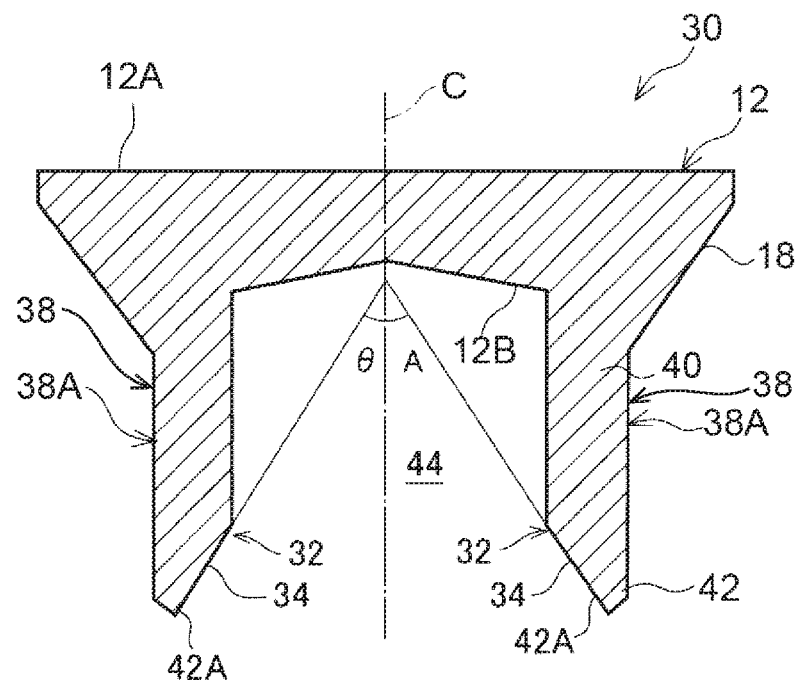
FIG. 5A is a longitudinal sectional view, corresponding to FIG. 1B, showing a state where major-axis leg portions in a leg portion of a fastener according to a second embodiment are viewed from the side.

As shown in FIG. 5A, the rivet 30 has a head portion 12 and the leg portion 38. The leg portion 38 is formed in a generally hollow cylindrical shape with an oval shape in an axis C direction view that is symmetric with and smaller than an oval shape of the head portion 12. In other words, the head portion 12 and the leg portion 38 are arranged such that their major axes CL and minor axes CS (neither shown) are overlapped with each other in the axis C direction view. One end portion 40 in the axial direction of the leg portion 38 is integrally connected to a back surface 12B of the head portion 12. The other end portion 42 in the axial direction of the leg portion 38 serves as a portion that is first inserted into a plurality of to-be-joined members stacked in the axis C direction. The inside 44 of the leg portion 38 is a cavity that is closed on its upper side by the head portion 12 and is opened to the outside on its lower side. Along the entire inner periphery at the other end portion 42 of the leg portion 38, the inclined surface 34 that is inclined radially outward with respect to the axial direction of the leg portion 38 is provided on the leading end 42A side of the other end portion 42.

A pair of easily deformable portions 32 are provided each at a corresponding one of the major-axis leg portions 38A which are portions crossing the major axis CL (see FIG. 1A) of the head portion 12 (the leg portion 38). Each easily deformable portion 32 is configured such that the inclination angle of the inclined surface 34 of the major-axis leg portion 38A with respect to the axis C is made smaller than the inclination angle of each of the inclined surfaces 35, shown in FIG. 5B, of the leg portion 38 other than the major-axis leg portions 38A with respect to the axis C. As one example, as shown in FIG. 5A, an angle θA formed between the inclined surface 34 of one of the major-axis leg portions 38A and the inclined surface 34 of the other major-axis leg portion 38A facing thereto is set in a range of about 48° to 72°. On the other hand, an angle θB formed between one and the other of the inclined surfaces 35 of a pair of minor-axis leg portions 38B, shown in FIG. 5B, which are portions crossing the minor axis CS (see FIG. 1A) of the head portion 12 (the leg portion 38) is set in a range of about 80° to 90°.

(Operation and Effect of Second Embodiment) Next, the operation and effect of this embodiment will be described.

Figure 5B:
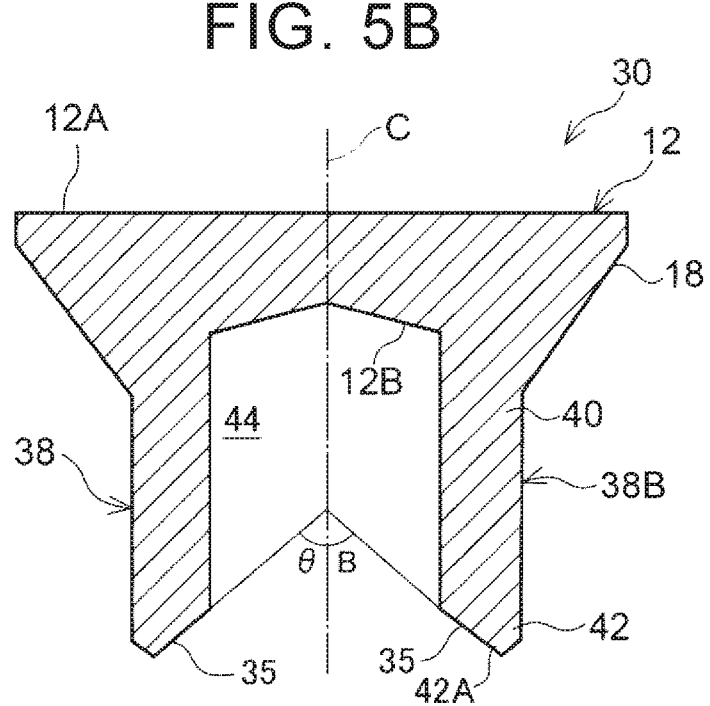
FIG. 5B is a longitudinal sectional view showing minor-axis leg portions with respect to FIG. 5A.

In this embodiment, as shown in FIGS. 5A and 5B, each easily deformable portion 32 is configured such that the inclination angle of the inclined surface 34 of the major-axis leg portion 38A with respect to the axis C direction is made smaller than the inclination angle of the inclined surface 35 of the leg portion 38 other than the major-axis leg portions 38A with respect to the axis C direction. In other words, the other end portion 42 of each major-axis leg portion 38A has a sharp shape compared to the other end portion 42 of the leg portion 38 other than the major-axis leg portions 38A. Therefore, since each easily deformable portion 32 reduces the flexural rigidity of the major-axis leg portion 38A, each major-axis leg portion 38A provided with the easily deformable portion 32 is deformable radially outward similarly to the other portions of the leg portion 38. Consequently, the rivet 30 can join the to-be-joined members to each other at narrow portions of the to-be-joined members without lowering the joining strength.

Since the other end portion 42 of each major-axis leg portion 38A provided with the easily deformable portion 32 has the sharp shape, insertion of the major-axis leg portions 38A into the to-be-joined members is facilitated at the time of caulking, so that it is possible to suppress buckling of the major-axis leg portions 38A and thus the leg portion 38. Therefore, not only a plurality of plate members each made of an aluminum alloy can be joined to each other, but also plate members one of which is made of an aluminum alloy and the other of which is made of high-strength iron can be joined to each other.

Third Embodiment

Next, a fastener according to a third embodiment of the disclosure will be described with reference to FIGS. 6A and 6B. The same symbols are assigned to portions having basically the same configurations as the above-described first embodiment, thereby omitting description thereof.

A rivet 50 as a fastener according to the third embodiment has the same basic configuration as the first embodiment and differs in that each of easily deformable portions 52 is configured such that a major-axis leg portion 54A is inclined radially outward with respect to an axial direction of a leg portion 54 on the other end portion 58 side.

Figure 6A:
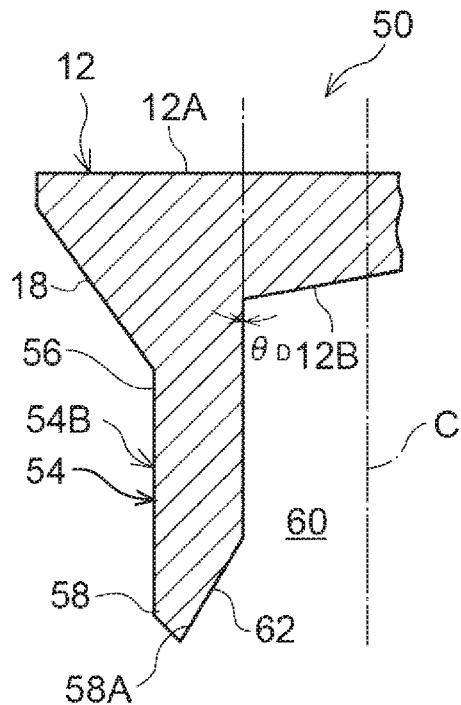
FIG. 6A is a longitudinal sectional view, corresponding to FIG. 1B, showing a state where a minor-axis leg portion in a leg portion of a fastener according to a third embodiment is viewed from the side.
Figure 6B:
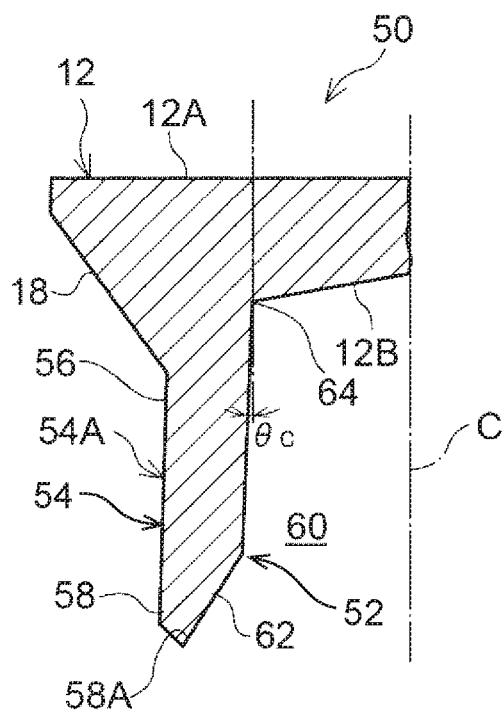
FIG. 6B is a longitudinal sectional view showing a major-axis leg portion with respect to FIG. 6A.

As shown in FIG. 6B, the rivet 50 has a head portion 12 and the leg portion 54. The leg portion 54 is formed in a generally hollow cylindrical shape with an oval shape in an axis C direction view that is symmetric with and smaller than an oval shape of the head portion 12. In other words, the head portion 12 and the leg portion 54 are arranged such that their major axes CL and minor axes CS (neither shown) are overlapped with each other in the axis C direction view. One end portion 56 in the axial direction of the leg portion 54 is integrally connected to a back surface 12B of the head portion 12. The other end portion 58 in the axial direction of the leg portion 54 serves as a portion that is first inserted into a plurality of to-be-joined members stacked in the axis C direction. The inside 60 of the leg portion 54 is a cavity that is closed on its upper side by the head portion 12 and is opened to the outside on its lower side. Along the entire inner periphery at the other end portion 58 of the leg portion 54, an inclined surface 62 that is inclined radially outward with respect to the axial direction of the leg portion 54 is provided on the leading end 58A side of the other end portion 58.

A pair of easily deformable portions 52 (only one of which is shown in FIG. 6B) are provided each at a corresponding one of the major-axis leg portions 54A which are portions crossing the major axis CL (see FIG. 1A) of the head portion 12 (the leg portion 54). Each easily deformable portion 52 is configured such that the major-axis leg portion 54A is inclined from its root portion 64 radially outward with respect to the axial direction of the leg portion 54 on the other end portion 58 side compared to the leg portion 54 other than the major-axis leg portions 54A. As one example, an inclination angle θC of each major-axis leg portion 54A with respect to the axis C direction is set in a range of about 1.25° to 1.67° radially outward, while an inclination angle θD of each of minor-axis leg portions 54B, shown in FIG. 6A, which are portions crossing the minor axis CS (see FIG. 1A) of the head portion 12 (the leg portion 54) is set to 0° with respect to the axis C direction. While the inclination angle θD is set to 0° in this embodiment, it is not limited thereto and may be set to other than 0°. In this case, the inclination angle θC is always set to an angle equal to or greater than the inclination angle θD.

(Operation and Effect of Third Embodiment) Next, the operation and effect of this embodiment will be described.

In this embodiment, as shown in FIGS. 6A and 6B, since each easily deformable portion 52 is configured such that the major-axis leg portion 54A is inclined radially outward with respect to the axial direction of the leg portion 54 on the other end portion 58 side compared to the leg portion 54 other than the major-axis leg portions 54A, when a fastening load is applied to the leg portion 54 along the axis C direction, each major-axis leg portion 54A tends to be deformed radially outward. Therefore, each major-axis leg portion 54A provided with the easily deformable portion 52 is deformable radially outward similarly to the other portions of the leg portion 54. Consequently, the rivet 50 can join the to-be-joined members to each other at narrow portions of the to-be-joined members without lowering the joining strength.

Further, since each easily deformable portion 52 is configured such that the major-axis leg portion 54A is inclined radially outward from the root portion 64, even when caulking members each having a low mechanical strength, such as a 3000-series alloy or an 8000-series alloy as an aluminum alloy by way of example, it is possible to firmly join them together. That is, even when caulking two or more to-be-joined members each having a low mechanical strength, since it is possible to open the major-axis leg portions 54A radially outward, the to-be-joined members can be firmly joined to each other by interlocking the leg portion 54 (by opening the other end portion 58 of the leg portion 54 radially outward to bite into the lower-side to-be-joined member).

While each easily deformable portion 52 in the leg portion 54 is inclined from the root portion 64 in this embodiment, the disclosure is not limited thereto, i.e. each easily deformable portion 52 may be inclined from a portion other than the root portion 64.

In the first to third embodiments described above, the easily deformable portions 16, 32, and 52 are respectively applied to the leg portions independently of each other, but the disclosure is not limited thereto. The easily deformable portions 16, 32, and 52 may be combined and applied to the same leg portion. As one example, in the case of joining together a plate member made of a 3000-series alloy as an aluminum alloy and a plate member made of high-strength iron, when an easily deformable portion 32 and an easily deformable portion 52 are combined and applied to a leg portion, it is possible to interlock the leg portion while preventing buckling thereof, so that the plate members can be firmly joined to each other. That is, by combining easily deformable portions 16, 32, and 52 and applying them to a leg portion according to materials, configurations, and so on of to-be-joined members, it is possible to obtain a proper joining result.

Further, each easily deformable portion is not limited to the configurations of the easily deformable portions 16, 32, and 52 and may have a configuration in which a leg portion is provided with a cutout or the like as a deformation start portion, and the deformation of a major-axis leg portion is carried out from this deformation start portion when a fastening load is applied.

While the embodiments of the disclosure have been described above, the disclosure is not limited thereto and can, of course, be carried out with various changes other than the above within a range not departing from the gist of the disclosure.

What is claimed is:

1. A fastener comprising:
a head portion formed in a cylindrical shape with an oval shape in an axial view;
a leg portion having a first end portion in an axial direction connected to a back surface of the head portion, the leg portion being formed in a hollow cylindrical shape with an oval shape in the axial view, a minor axis direction of the oval shape of the leg portion being the same as a minor axis direction of the oval shape of the head portion, the leg portion being configured such that when a fastening load is applied from the head portion, a second end portion in the axial direction of the leg portion is deformed radially outward of the leg portion in a plurality of to-be-joined members such that the to-be-joined members are caulked to each other; and
an easily deformable portion located on major-axis leg portions of the leg portion, the major-axis leg portions crossing a major axis of the leg portion and having a lesser thickness than a thickness of a remainder of the leg portion, the easily deformable portion being configured such that (i) when the fastening load is applied, the major-axis leg portions are deformed radially outward of the leg portion similarly to another portion of the leg portion other than the major-axis leg portions.

2. The fastener according to claim 1, wherein:
along an inner periphery at the second end portion of the leg portion, an inclined surface inclined radially outward with respect to the axial direction of the leg portion is provided on a leading end side of the second end portion, and
the easily deformable portion is configured such that an inclination angle of the inclined surface of the major-axis leg portions with respect to the axial direction of the leg portion is less than an inclination angle of an inclined surface of the leg portion other than the major-axis leg portions with respect to the axial direction of the leg portion.

3. The fastener according to claim 1, wherein the easily deformable portion is configured such that a major-axis leg portion at the easily deformable portion is inclined further radially outward with respect to the axial direction of the leg portion on the second end portion side than the remainder of the leg portion with the exception of the major-axis leg portions.

\* \* \* \* \*